3,389,110
FILM-FORMING BLOCK COPOLYMERIC EMULSIONS PREPARED FROM A POLYMERIZABLE AMIDE
David D. Taft, Minneapolis, Minn., assignor to Ashland Oil & Refining Company, Ashland, Ky., a corporation of Kentucky
No Drawing. Continuation-in-part of application Ser. No. 423,376, Jan. 4, 1965. This application Sept. 2, 1965, Ser. No. 484,731
9 Claims. (Cl. 260—29.6)

ABSTRACT OF THE DISCLOSURE

A method of producing a copolymeric emulsion containing the following four classes of monomers:

(1) aliphatic ester of $\alpha,\beta$-unsaturated monocarboxylic acid;
(2) polymerizable unsaturated amide;
(3) copolymerizable vinyl compound; and
(4) $\alpha,\beta$-unsaturated mono- or di-carboxylic acid or salt thereof or a monoester of a dicarboxylic acid or salt thereof.

The method involves a two-step process wherein all of monomer (1) and portions of the remaining monomers are polymerized in the first step and the remaining portions of monomers are polymerized in the second step. The product of the process is a coating composition which produces hard, clear, high gloss, mar resistant, adherent, flexible, water resistant and caustic resistant films.

Disclosure of the invention

This is a continuation-in-part of Ser. No. 423,376 filed Jan. 4, 1965.

This invention relates to a process of forming emulsions which can, in turn, form hard, clear, high gloss, mar resistant, adherent, flexible water and caustic resistant polymer films. In a second aspect this invention relates to these cured films. In still another aspect, this invention relates to a novel process of interpolymerizing four classes of monomers: (1) aliphatic ester of $\alpha,\beta$-unsaturated monocarboxylic acid; (2) polymerizable unsaturated amide; (3) copolymerizable vinyl compound; and (4) $\alpha,\beta$-unsaturated mono- or di-carboxylic acid or salt thereof, or a monoester of a dicarboxylic acid or salt thereof.

The general concept of combining copolymerizable monomers to prepare film-forming copolymers is already well-known. One standard preparation of copolymeric emulsions from the above-noted monomers employs a delayed addition of a single mixture of all the copolymerizable monomer to an aqueous solution containing suitable dispersing aids and in the presence of an appropriate catalyst. Since this reaction is conducted near the reflux temperature through the controlled addition of the monomers, this type of polymerization is known as a reflux emulsion copolymerization. If this same copolymerization reaction is initiated in the presence of a catalyst reducing agent, a redox emulsions copolymerization results. In this latter case, the increased efficiency of the redox system does not require external heating since the reaction produces a vigorous exotherm which completes the copolymerization.

I have discovered that by dividing the four monomers into two separately added charges (hereinafter referred to as Premix A and Premix B) and by controlling the makeup of each charge, a block copolymeric emulsion can be produced which is distinctively different from copolymeric emulsions prepared by simultaneously reacting the same monomers in the same proportions. With certain selected monomers, I am able to form copolymeric emulsions which, when cast in film form at room temperature, form a continuous film. Such a film can then be cured by air drying at room temperature to thereby form a clear, high gloss, mar resistant, flexible film. Baking these films increases the hardness, and improves the water and caustic resistance. The emulsions of the present invention (with and without pigments, flow control agents and the like) are useful in forming films (protective or decorative films) on a variety of substrates, e.g., wood, metal, paper, paper board, etc. Further unsupported or free films can also be formed from my copolymeric emulsions.

The unique nature of the copolymeric emulsion of my invention can be demonstrated by comparing the glass transition temperature and/or the minimum film formation temperature of my block copolymeric emulsion with the same values obtained for a copolymeric emulsion prepared by conventional techniques from exactly the same monomers in exactly the same proportions. I have observed that the minimum film formation temperature of my block copolymeric emulsion is less than that of the conventional copolymeric emulsions. Actually, preparation of copolymeric emulsion by my process results in a lowering of the glass transition temperature. In addition, my process produces a lower viscosity emulsion when compared to conventional processes.

Among the many other advantages of my process are: (1) the ability to incorporate harder monomers into certain copolymeric emulsions without destroying the ability of the emulsions to form continuous films at room temperature; (2) the ability to substantially duplicate the properties of conventional random copolymeric emulsions with my block copolymeric emulsions which have been formulated to include significantly more of the low cost monomers, thereby realizing a significant reduction in cost without sacrificing performance; (3) the ability of some of my copolymeric emulsions to form continuous films at room temperature, which films can be air dried at room temperature; (4) the ability of all of my copolymeric emulsions to be cured by baking or, optionally, by means of common cross-linking resins (e.g., the aminoplast cross-linking resins); and (5) quite importantly, the ability of my copolymeric emulsions to form more flexible films on baking than can be obtained from conventional copolymeric emulsions prepared from the same monomers present in the same proportions.

In accordance with my invention, liquid phase, catalyzed emulsion polymerization techniques are employed wherein at least four classes (and preferably only four classes) of monomeric substances are employed. The applicable range of quantities of the monomeric substances (based on the combined weight of Premix A and Premix B) are as follows:

(1) 20–90% by weight of ester of $\alpha,\beta$-unsaturated carboxylic acid;
(2) 20–1% by weight of polymerizable unsaturated amide;
(3) 50–8% by weight of copolymerizable vinyl compound; and
(4) 10–1% by weight of ethylenically unsaturated mono- or di-carboxylic acid or salt thereof, or monoester of a dicarboxylic acid or salt thereof.

The preferred range of quantities of the monomeric substances are as follows:

(1) 35–75% by weight of ester of $\alpha,\beta$-unsaturated carboxylic acid;
(2) 10–2% by weight of polymerizable unsaturated amide;
(3) 45–10% by weight of copolymerizable vinyl compound; and (4) 8–3% by weight of unsaturated mono- or dicarboxylic acid or salt thereof, or monoester of a dicarboxylic acid or salt thereof.

The monomeric ingredients are divided into a first charge (Premix A) and a second charge (Premix B). Premix A contains the entire quantity (or substantially so) of the ester of the α,β-unsaturated carboxylic acid, a portion (usually from 10–95%, e.g., 50–90%) of the polymerizable unsaturated amide, a portion (usually from 10–95%, e.g., 50–90%) of the α,β-unsaturated mono- or dicarboxylic acid or salt (or mono-ester of a dicarboxylic acid or salt thereof), and approximately 10–80% (e.g., 30–60%) by weight of the monoethylenically unsaturated compound (i.e., the copolymerizable vinyl compound) which by itself forms a hard polymer.

The remaining monomers form Premix B. It should be noted that it is important for each of the four classes of copolymerizable monomers to be represented by at least one monomer. Thus, polymerizable unsaturated amide might be represented by N-methylol acrylamide, only, while the vinyl compound might be represented by a mixture of styrene and methyl methacrylate. The predominant ingredient in the second charge (i.e., in Premix B) will be the vinyl compound.

In the preferred method of preparation, Premix A is slowly added at, for example, 160° F., to a previously prepared aqueous emulsifying solution containing suitable dispersing aids (e.g., anionic and/or non-ionic surfactants) and a suitable catalyst. Although the addition temperature for Premix A can range from room temperature to the boiling point of water, experience has shown that temperatures of from 150° to 190° F., more usually from 160 to 180° F., are especially desirable. Temperatures at or near the reflux temperature are quite effective. The pressure employed throughout the entire polymerization process is preferably atmospheric or substantially atmospheric. However, reduced and elevated pressures can also be used, e.g., elevated pressures are desirable if a volatile monomer has been used. An inert atmosphere can also be used. During the addition of Premix A, a moderate rise in temperature to between about 150° to 212° F., more usually from 160° to 205° F., e.g., to 175° to 200° F. is noted. After addition of Premix A has been completed (it usually requires from 1 to 4 hours), it is desirable to cook the mixture at the same temperature for a short period of time (e.g., 1 to 30 minutes). Then, Premix B is added over a short period of time (e.g., 3 to 90 minutes) and the temperature will again rise, frequently to between about 175° to 200° F. At the end of the addition of Premix B, the reactants are then preferably given a heat treatment, generally about ½ to 4 hours, e.g., 2 to 3 hours, at a temperature of between about 140° and 212° F., generally from 160° to 210° F., and more desirably from 180° to 200° F. One effect of this heat treatment is to ensure that the monomers are completely converted to copolymer. The emulsion is then cooled. If necessary, the emulsion will then be neutralized to adjust the pH to about 5–9, e.g., to 6–8 by suitable means such as an ammonia solution or an alkyl amine (e.g., triethyl amine).

Additionally, a normal redox polymerization can also be used for the preparation of my block copolymeric emulsions. In this case, Premix A is added at room temperature to an aqueous emulsifying solution containing suitable dispersing aids (anionic and/or non-ionic surfactants) and a catalyst. A catalyst reducing agent is then added. An exothermic reaction ensues and the temperature rises to the reflux temperature of the system. After the reaction subsides, Premix B is added, and the reaction continued at 140° to 212° F., preferably at 160° to 185° F., e.g. 165° to 180° F. In this manner, Premix A undergoes a redox emulsion copolymerization while Premix B is copolymerized under reflux conditions. If desired, the reaction mixture can be cooled (e.g., to room temperature) after Premix A has reacted, and Premix B together with additional catalyst and additional catalyst reducing agent can then be added. In this manner, both Premix A and Premix B will undergo a redox emulsion copolymerization. In addition to these two general procedures, other methods of latex emulsion preparation, conventional to the field of emulsion polymerization, may be applied. For example, the monomers can be pre-emulsified in the presence of a portion of the water and surfactants.

The block copolymeric emulsions just described can be cast in film form on a suitable substrate (e.g., metal) and frequently these films can be air dried at room temperature to thereby form continuous, glossy films. More preferably, the wet films (regardless of their ability to dry at room temperature) are cured by baking, usually at temperatures of from 150° to 400° F., e.g., 200° to 325° F. The resulting baked films display greater hardness, toughness and solvent resistance. Further, my copolymeric emulsions can be modified by reacting them with formaldehyde (e.g., a para-formaldehyde or methyl or butyl formacel) to thereby form the methylol derivative. This modification can be accomplished prior to or at the time of application. Further, my emulsion copolymers can be blended with triazines, ureas, triazones, and the like as well as epoxides (e.g., the Epons) prior to application. In this manner, a thermosetting resin can be prepared.

Applicable esters of an α,β-unsaturated mono-carboxylic acid are the various acrylates and methacrylates. Typically, the $C_1$–$C_{18}$ alkyl and $C_1$–$C_{18}$ alkoxyalkyl esters will be employed. Examples of such esters are methyl acrylate, ethyl acrylate, n-propyl acrylate, isopropyl acrylate, n-butyl acrylate, isobutyl acrylate, amyl acrylate, isoamyl acrylate, hexyl acrylate, 2-ethylhexyl acrylate, octyl acrylate, 3,5,5-trimethyl hexyl acrylate, decyl acrylate, lauryl acrylate, dodecyl acrylate, cetyl acrylate, octodecyl acrylate, octadecenyl acrylate, ethyl methacrylate, n-propyl methacrylate, isopropyl methacrylate, butyl methacrylate, n-amyl methacrylate, sec.-amyl methacrylate, hexyl methacrylate, 2-ethylhexyl methacrylate, octyl methacrylate, 3,5,5-trimethylhexyl methacrylate, decyl methacrylate, dodecyl methacrylate, octadecyl methacrylate, butoxyethyl acrylate, butoxyethyl methacrylate, other alkoxyalkyl acrylates or methacrylates, and the like. Mixtures of two or more of these esters can be used, e.g., a mixture of ethyl acrylate and isobutyl acrylate. The methyl, ethyl, butyl and 2-ethyl hexyl esters of acrylic acid and the butyl esters of methacrylic acid are the preferred esters. The acrylates are especially preferred. Because the lower alkyl esters of methacrylic acid (e.g., methyl methacrylate) are such hard monomers, I prefer to use them as part or all of the vinyl monomer (hereinafter defined).

Suitable polymerizable amides are those ethylenically unsaturated amides having the following characteristic structure:

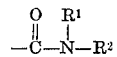

wherein $R^1$ and $R^2$ are independently selected from the group consisting of hydrogen, hydroxyl, hydroxyalkyl, and alkoxyalkyl. Where $R^1$ (or $R^2$) is other than hydrogen or hydroxyl, it will contain from 1–8, and more usually from 1–4, carbon atoms. These amides are typically prepared from acrylic acid, methacrylic acid, and, to a lesser degree, from crotonic acid. Suitable polymerizable amides include acrylamide, per se, N-methylol acrylamide, N-methylol methacrylamide, methacrylamide, N-butyl-N-methylol acrylamide, and the like. Mixtures of these polymerizable amides can be used. Acrylamide, methacrylamide, and N-methylol acrylamide are preferred. Acrylamide, per se, is particularly preferred.

Suitable polymerizable vinyl compounds are vinyl aromatic compounds such as styrene, α-methyl styrene, vinyl toluene, the mono-chloro styrenes, vinyl acetate, vinyl chloride and vinylidene chloride; and alkyl methacrylates having an alkyl group containing 1–5 carbon atoms. Mixtures of these compounds can be used, e.g., a mixture of styrene and methyl methacrylate. Styrene and the alkyl methacrylates are preferred. Styrene is particularly preferred.

Suitable α,β-unsatuated mono- and di-carboxylic acids are methacrylic acid, acrylic acid, crotonic acid, fumaric acid, maleic acid, citraconic acid, and itaconic acid. Monoalkyl esters of these dicarboxylic acids can also be used. In place of the free acids and half-esters, the water soluble salts thereof can be used, including the ammonium salts and the alkali metal salts such as lithium or potassium carboxylates. Mixtures of these various compounds can also be used, e.g., a mixture of acrylic acid and methacrylic acid. Methacrylic acid, acrylic acid, and itaconic acid are preferred.

Either anionic or non-ionic emulsifiers, or a blend of anionic and non-ionic emulsifiers, can be used as dispersing aids in the emulsion preparation. A specific representative non-ionic surfactant useful in emulsion polymerization of the present invention is nonylphenyl polyethylene glycol ether containing 10–12 ethoxy units. However, other surfactants can be selected from the ethylene oxide condensates of long chain fatty acids and alkyl phenols or alcohols. With respect to the anionics, a large group is available from which one or more can be selected: sodium lauryl sulfate; salts of high molecular weight fatty acids and amino soaps; alkali metal salts of straight or branched chain alkyl sulfates, sulfonates, and sulfated dicahboxylic acids; and sodium salts of mono- or disulfonated hydrocarbons and alkaryl sulfonates.

The polymerization catalyst will usually and preferably be one of the following: potassium persulfate, ammonium persulfate, or azo-bis-isobutyronitrile. Other suitable organic catalysts can be employed, alone or in combination with a typical reducing agent. Such reducing agents include sodium hydrosulfite, sodium metasulfite, potassium sulfite, zinc formaldehyde-sulfoxolate and calcium bisulfite.

Since is it desirable to prepare emulsions having a low viscosity and a high solids content, a chain modifying agent or chain terminator can be added to the polymerization mixture to limit the molecular weight of the block copolymer. The mercaptans such as dodecyl mercaptan, tertiary dodecyl mercaptan, octyl mercaptan, hexyl mercaptan and the like are conventionally used for this purpose. However, other chain modifying agents such as cyclopentadiene, allyl acetate, allyl carbamate and the like may be employed. Use of such chain terminators is common in the polymerization art and is an act within the skill of one routinely engaged in this art.

The present invention will be further understood by reference to the following specific examples, which include a preferred embodiment. Unless otherwise indicated, all parts and percentages are by weight.

Example I

| Premix A: | Parts |
|---|---|
| Ethyl acrylate | 330 |
| Acrylamide | 20 |
| Styrene | 118 |
| Methacrylic acid | 12 |

| Premix B: | |
|---|---|
| Acrylamide | 8 |
| Styrene | 108 |
| Methacrylic acid | 4.5 |
| Sodium lauryl sulfate | 6.3 |
| Nonylphenyl polyethylene glycol ether (10 moles of ethylene oxide) | 21 |
| Potassium persulfate | 3 |
| Water | 744.7 |

The sodium lauryl sulfate, nonylphenyl polyethylene glycol ether, and water were mixed in a three-necked flask fitted with a stirrer, thermometer, reflux condenser and inlet means for nitrogen. The mixture was carefully sparged with nitrogen and heated to 165° F. with agitation. The catalyst (potassium persulfate) was then added. After approximately five minutes, 10% of Premix A was added. After a noticeable exothermic reaction, the remainder of Premix A was slowly added to the contents of the flask while maintaining rapid agitation. The addition was maintained at a rate so that excessive refluxing did not occur. During the addition (which required 2½ hours) the temperature was permitted to rise to 180° F. Fifteen minutes after the addition of Premix A was completed, Premix B was added. The addition of Premix B required ten minutes. The resulting emulsion was then heated for two hours in the range of 180° to 204° F. The emulsion was then cooled. The pH was 5.2 and the viscosity of the emulsion was 1680 cps. at a non-volatile content (NV) of 42.4%. The viscosity was measured on a Brookfield RVT viscometer using a number four (4) spindle at 100 r.p.m.

A 0.0015 inch wet film of this emulsion was cast on a glass plate. The film cured by air drying at room temperature to form a clear, continuous, tack free, very glossy, durable film in 15 minutes. After one hour the film exhibited tough adhesion, good flexibility, good mar resistance, but lacked the desired level of water and caustic resistance. Differential thermal analysis (DTA) gave a value of 13° C. for the glass transition temperature (Tg).

A clear film (0.003 inch wet) cast on glass from this same emulsion and baked for twenty (20) minutes at 250° F. had a Sward hardness of 24. This latter film, having an excellent level of flexibility, was unaffected after 20 minutes treatment with water or 5% caustic.

In contradistinction to this example, a useless emulsion was obtained when the same procedure was followed except that all of the monomers were slowly added as a single charge. The resulting emulsion was too viscous to be measured in a Brookfield viscometer. Further, a film cast from this emulsion did not form a continuous film on drying at room temperature. By DTA, the glass transition temperature (Tg) was 27° C. This difference in Tg is clear and convincing evidence of the difference between the inventive block copolymeric emulsion and the random copolymer emulsion.

The difference between my block copolymeric emulsions and the prior art emulsions can be repeatedly demonstrated by selecting monomers of the herein defined classes which, on the basis of their glass transition factors (Glass transition factors for different monomers are available in published form, e.g., see Table SP–222 dated March 1965, published by Rohm and Hass Company of Philadelphia), should give a copolymer having a minimum film formation temperature slightly above (e.g., 5° above) room temperature. When these monomers are combined by conventional techniques, a continuous cured film cannot generally be prepared at room temperature. Surprisingly, when the same monomers are combined, in the same proportions, by my technique, continuous cured films can generally be obtained by air drying at room temperature. I do not mean to imply that my invention is limited to copolymeric emulsions which will form continuous films on air drying at room temperature. It is not so limited. Rather, it is with these particular emulsions that the differences between my block copolymeric emulsions and the prior art emulsions become so pronounced.

Example II

The emulsion of Example I was cast in film form on glass (0.003 inch wet film). This wet film was cured by air drying at room temperature. The cured film was then peeled from the glass. A thin, clear, glossy, unsupported or free film was obtained. Two pieces of this free film were tested for tensile strength. One had a tensile strength of 1834 p.s.i. at 120% elongation. The other had a tensile strength of 1684 p.s.i. at 60% elongation.

Example III

| Premix A: | Parts |
|---|---|
| Ethyl acrylate | 312 |
| Methyl methacrylate | 48 |
| Styrene | 54 |
| Acrylamide | 54 |
| Methacrylic acid | 18 |
| Lauryl mercaptan | 4.5 |

| Premix B: | |
|---|---|
| Methyl methacrylate | 42 |
| Styrene | 48 |
| Methacrylic acid | 6 |
| Acrylamide | 18 |
| Lauryl mercaptan | 1.5 |
| Potassium persulfate (4% sol.) | 4 |
| Sodium lauryl sulfate | 6.6 |
| Nonylphenyl polyethylene glycol ether (10–13 moles of ethylene oxide) | 15 |
| Water | 845 |

The procedure of Example I was followed. The pH of the emulsion copolymer was 5.2. The viscosity was 1680 cps. (measured as in Example I) at an NV of 48.4%.

A 0.003 inch wet film was cast on a glass plate and baked at 250° F. for 20 minutes. The cured film exhibited a Sward hardness of 24, was glossy, flexible, and had good resistance to water and caustic.

From the foregoing examples, it can be seen that the block copolymerization technique of the present invention results in a product having unique film forming properties. Although it need not be used in this manner, my process, permits the formation of emulsions yielding room temperature, air-curable (as well as thermosetting) films. Certain emulsions prepared from the same monomer percentages without the unique split-addition technique have been demonstrated not to form continuous cured films at room temperature. Therefore, with my split-addition technique, larger percentages of the cheaper, harder, vinyl compounds can be incorporated into the emulsions than in normal air-curing systems containing the same components. The vinyl monomer imparts hardness, mar resistance, water and caustic resistance to the cured films. The ester of the $\alpha,\beta$-unsaturated carboxylic acid provides a network for film formation as well as imparting flexibility to the cured films.

Having described the present invention with a certain degree of particularity, it will be realized that numerous minor changes and variations, falling within the spirit and scope of this invention, will become obvious to those skilled in the art. It is not intended that this invention be limited to any of the materials which have been mentioned as specific examples nor by any of the specific proportions which have been given for the sake of illustration, but it is intended to claim all novelty inherent in the invention, as well as all obvious modifications and variations thereof.

What is claimed is:
1. The method of producing a copolymeric emulsion containing 100 parts by weight of copolymer which comprises:
    (a) in a first step, emulsion polymerizing a mixture consisting of the following copolymerizable monomers:
        (1) all of a total of 35 to 75 parts by weight of a member of the class consisting of methyl acrylate, ethyl acrylate, butyl acrylate, 2-ethyl hexyl acrylate, and butyl methacrylate,
        (2) 50–90% by weight of a total of 10 to 2 parts by weight of a member of the class consisting of acrylamide, methacrylamide, and N-methylol acrylamide,
        (3) 30–60% by weight of 45 to 10 parts by weight of styrene or a mixture of styrene and an alkyl methacrylate in which the alkyl group contains 1–5 carbon atoms, and
        (4) 50–90% by weight of a total of 8–3 parts by weight of a member of the group consisting of methacrylic acid, acrylic acid, and itaconic acid; said emulsion polymerization being carried out by slowly adding said components to an aqueous emulsifying solution at a temperature of from 150° to 190° F. with agitation, and
    (b) in a subsequent second step, emulsions polymerizing the product of the first step with a mixture containing as the sole copolymerizable components the remainder of monomer (2), the remainder of monomer (3), and the remainder of monomer (4); and
    (c) thereafter heat treating the polymerizer emulsion for ½ to 4 hours at a temperature of between about 180° to 200° F.
2. The method of claim 1 wherein monomer (2) is acrylamide.
3. The method of claim 1 wherein monomer (2) is N-methylol acrylamide.
4. A product produced by the process of claim 1.
5. A coated substrate produced by casting on a substrate a film of the heat treated emulsion produced by the method of claim 1, and, thereafter curing said film.
6. The method which comprises:
    (a) in a first step, emulsion polymerizing a mixture consisting of the following monomers: about 330 parts by weight of ethyl acrylate, about 20 parts by weight of acrylamide, about 118 parts by weight of styrene, and about 12 parts by weight of methacrylic acid;
    (b) in a subsequent second step, emulsion polymerizing polymerization product of the first step with a mixture consisting of the following monomers: about 8 parts by weight of acrylamide, about 108 parts by weight of styrene, and about 4.5 parts by weight of methacrylic acid; and
    (c) Thereafter heat treating the resulting emulsion for about two hours at about 180° to 204° F.
7. Product produced by the process of claim 6.
8. The method of claim 6 wherein the heat treated emulsion is cast in film form on a substrate and the film is thereafter cured.
9. Coated substrate produced by the process of claim 8.

References Cited
UNITED STATES PATENTS

| 2,132,671 | 10/1938 | Bauer | 260—86.1 |
| 2,978,437 | 4/1961 | Christenson | 260—72 |
| 3,057,812 | 10/1962 | Straughan et al. | 260—29.6 |
| 3,244,655 | 4/1966 | Sullivan et al. | 260—29.6 |
| 3,247,139 | 4/1966 | Christenson et al. | 260—29.6 |

MURRAY TILLMAN, *Primary Examiner.*

J. T. GOOLKASIAN, *Assistant Examiner.*